(12) United States Patent
Nishikawa et al.

(10) Patent No.: US 11,718,700 B2
(45) Date of Patent: Aug. 8, 2023

(54) RUBBER-STEEL CORD COMPOSITE AND PNEUMATIC TIRE

(71) Applicant: Toyo Tire Corporation, Itami (JP)

(72) Inventors: Yuma Nishikawa, Itami (JP); Norio Minouchi, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/330,709

(22) Filed: May 26, 2021

(65) Prior Publication Data

US 2021/0388144 A1 Dec. 16, 2021

(30) Foreign Application Priority Data

Jun. 10, 2020 (JP) .................................. 2020-101243

(51) Int. Cl.
| | | |
|---|---|---|
| *C08F 292/00* | (2006.01) | |
| *C08K 3/06* | (2006.01) | |
| *B60C 9/00* | (2006.01) | |
| *C08K 5/47* | (2006.01) | |
| *B60C 1/00* | (2006.01) | |

(52) U.S. Cl.
CPC .......... *C08F 292/00* (2013.01); *B60C 9/0007* (2013.01); *C08K 3/06* (2013.01); *C08K 5/47* (2013.01); *B60C 2001/0066* (2013.01); *B60C 2009/0021* (2013.01)

(58) Field of Classification Search
CPC ................. C08F 292/00; B60C 9/0007; B60C 2001/0066; B60C 2009/0021; B60C 2001/005; B60C 1/0041; C08K 3/06; C08K 5/47; C08K 5/34922; C08K 5/40; C08K 5/42; C08K 2201/019; C08L 7/00; C08L 61/06
See application file for complete search history.

(56) References Cited

U.S. PATENT DOCUMENTS

| 4,947,916 | A | 8/1990 | Ishikawa et al. | |
|---|---|---|---|---|
| 2020/0109252 | A1* | 4/2020 | Mukai | ........................ C08L 7/00 |
| 2021/0388143 | A1* | 12/2021 | Nishikawa | ............ B60C 9/0007 |
| 2021/0388144 | A1 | 12/2021 | Nishikawa et al. | |
| 2021/0388198 | A1* | 12/2021 | Nishikawa | .............. C08L 51/10 |

FOREIGN PATENT DOCUMENTS

| EP | 2708529 A1 * | 3/2014 | ........... C07C 381/02 |
|---|---|---|---|
| EP | 3808895 A1 | 4/2021 | |
| JP | 10-195237 A | 7/1998 | |
| JP | 2003-82586 A | 3/2003 | |
| JP | 2004-83766 A | 3/2004 | |
| JP | 2005-225985 A | 8/2005 | |
| JP | 2008-308632 A | 12/2008 | |
| JP | 2019-77983 A | 5/2019 | |
| WO | 2019/240252 A1 | 12/2019 | |

OTHER PUBLICATIONS

Non-Final Office Action dated Oct. 14, 2022, issued in U.S. Appl. No. 17/330,664 (11 pages).
Non-Final Office Action dated May 26, 2023, issued in U.S. Appl. No. 17/330,687. (27 pages).

\* cited by examiner

*Primary Examiner* — Angela C Scott
(74) *Attorney, Agent, or Firm* — WHDA, LLP

(57) ABSTRACT

A rubber-steel cord composite according to an embodiment is formed by vulcanizing and bonding a rubber composition containing 1 to 10 parts by mass of sulfur, 0.1 to 5 parts by mass of N,N-dibenzylbenzothiazole-2-sulfenamide, and 0.1 to 5 parts by mass of either one or both of hexamethylene bis-thiosulfate disodium salt dihydrate and 1,6-bis(N,N-dibenzylthiocarbamoyldithio)hexane, with respect to 100 parts by mass of diene rubber containing natural rubber, and a steel cord. A pneumatic tire according to an embodiment includes the rubber-steel cord composite.

11 Claims, No Drawings

RUBBER-STEEL CORD COMPOSITE AND PNEUMATIC TIRE

CROSS-REFERENCE TO RELATED APPLICATIONS

This application is based upon and claims the benefit of priority from the prior Japanese Patent Application No. 2020-101243, filed on Jun. 10, 2020; the entire contents of which are incorporated herein by reference.

BACKGROUND

1. Field of the Invention

The present disclosure relates to a rubber-steel cord composite and a pneumatic tire using the same.

2. Description of Related Art

As a reinforcing material for a belt, a carcass ply, or the like, of a pneumatic tire or as a reinforcing material for reinforcing an industrial belt member or the like, a rubber-steel cord composite obtained by vulcanizing and bonding a rubber composition and a steel cord is used. The rubber-steel cord composite is required to have excellent initial adhesiveness and excellent adhesiveness after aging in order to maintain the initial adhesiveness for a long period of time.

In a related art, a rubber composition, which is used for adhesion to a steel cord, generally uses N,N-dicyclohexyl-2-benzothiazolesulfenamide (DCBS) as vulcanization accelerator. On the other hand, JP-A-2008-308632 discloses that a rubber composition forming a composite together with a metal material is mixed with N,N-dibenzylbenzothiazole-2-sulfenamide (DBBS) as a vulcanization accelerator.

On the other hand, in this type of rubber composition, cobalt organic acid is generally mixed in order to improve adhesiveness with the steel cord. JP-A-10-195237 and JP-A-2004-083766 propose that the rubber composition of the rubber-steel cord composite is mixed with hexamethylene bis-thiosulfate disodium salt dihydrate and inorganic hydrated salt in order to reduce the cobalt organic acid.

JP-A-2003-082586 discloses that hexamethylene bis-thiosulfate disodium salt dihydrate and 1,6-bis(N,N-dibenzylthiocarbamoyldithio)hexane are mixed with a rubber composition for coating a tire cord.

SUMMARY

Since DCBS as a vulcanization accelerator may have an influence on an environment, it is required to reduce a usage amount of DCBS. Therefore, it is desired to improve initial adhesiveness and adhesiveness after aging while using a vulcanization accelerator having little influence on the environment. Since cobalt organic acid also has an influence on the environment, it is desirable to reduce a usage amount thereof.

In consideration of tire productivity, it is desirable that even when a rubber composition is left unvulcanized for a long time and then vulcanized and bonded, adhesiveness of the rubber composition to a steel cord is excellent, that is, adhesiveness after storage is excellent.

An object of an embodiment of the present disclosure is to provide a rubber-steel cord composite capable of providing excellent initial adhesiveness, adhesiveness after aging, and adhesiveness after storage, while a vulcanization accelerator having little influence on an environment is used in a rubber composition, and even though the rubber composition does not necessarily contain cobalt organic acid, and a pneumatic tire using the same.

A rubber-steel cord composite according to an embodiment of the present disclosure is formed by vulcanizing and bonding a rubber composition containing 1 to 10 parts by mass of sulfur, 0.1 to 5 parts by mass of N,N-dibenzylbenzothiazole-2-sulfenamide, and 0.1 to 5 parts by mass of either one or both of hexamethylene bis-thiosulfate disodium salt dihydrate and 1,6-bis(N,N-dibenzylthiocarbamoyldithio)hexane, with respect to 100 parts by mass of diene rubber containing natural rubber, and a steel cord.

The rubber composition may not contain cobalt organic acid, or a content of the cobalt organic acid may be 3 parts by mass or less with respect to 100 parts by mass of the diene rubber.

A pneumatic tire according to an embodiment of the present disclosure includes the rubber-steel cord composite.

According to an embodiment of the present disclosure, while N,N-dibenzylbenzothiazole-2-sulfenamide is used as a vulcanization accelerator having little influence on an environment, either one or both of hexamethylene bis-thiosulfate disodium salt dihydrate and 1,6-bis(N,N-dibenzylthiocarbamoyldithio)hexane are mixed with a rubber composition. Accordingly, excellent initial adhesiveness, adhesiveness after aging, and adhesiveness after storage can be obtained. Therefore, even though cobalt organic acid is not necessarily contained in the rubber composition, excellent adhesiveness can be obtained.

DESCRIPTION OF EMBODIMENTS

Hereinafter, embodiments of the present disclosure will be described in detail.

A rubber-steel cord composite according to the embodiment of the present disclosure is formed by vulcanizing and bonding a rubber composition and a steel cord. The rubber composition contains; 1 to 10 parts by mass of sulfur; 0.1 to 5 parts by mass of N,N-dibenzylbenzothiazole-2-sulfenamide; and 0.1 to 5 parts by mass of either one or both of hexamethylene bis-thiosulfate disodium salt dihydrate and 1,6-bis(N,N-dibenzylthiocarbamoyldithio)hexane, with respect to 100 parts by mass of diene rubber containing natural rubber.

In the rubber composition, the diene rubber as a rubber component contains natural rubber (NR). The diene rubber may be the natural rubber alone, or may contain other types of diene rubber together with the natural rubber. As other types of diene rubber, examples thereof include isoprene rubber (IR), butadiene rubber (BR), styrene butadiene rubber (SBR), nitrile rubber (NBR), styrene isoprene copolymer rubber, styrene isoprene butadiene copolymer rubber, or the like. Among the examples thereof, any one type may be used alone or two or more types may be used in combination. Among the examples thereof, as other types of diene rubber, it is desirable to use at least one type to be selected from a group consisting of IR, BR, and SBR, and more desirable to use IR.

The 100 parts by mass of diene rubber desirably contains 50 parts by mass or more of natural rubber, more desirably contains 70 parts by mass or more of natural rubber, much more desirably contains 80 parts by mass or more of natural rubber, and may contain 100 parts by mass of natural rubber.

In the rubber composition, as sulfur as a vulcanizing agent, examples thereof include powdered sulfur, precipitated sulfur, colloidal sulfur, insoluble sulfur, oil-treated sulfur, or the like. A mixing amount of sulfur is desirably 1 to 10 parts by mass, more desirably 2 to 8 parts by mass, and may be 4 to 6 parts by mass, with respect to 100 parts by mass of diene rubber.

In the rubber composition, N,N-dibenzylbenzothiazole-2-sulfenamide (DBBS) (another name: 2-[(dibenzylamino)thio]benzothiazole) is used as the vulcanization accelerator. DBBS is a compound represented by the formula (1) below. DBBS has little influence on the environment of a secondary amine generated during vulcanization reaction, with respect to N,N-dicyclohexyl-2-benzothiazolesulfenamide which may have an influence on the environment. DBBS is excellent in initial adhesiveness because a vulcanization rate is relatively slow and sulfur is well dispersed into an adhesive layer between a rubber layer and a metal. When DBBS is used, the rubber composition after mixing (before vulcanization) is stable in air and also excellent in adhesiveness after storage.

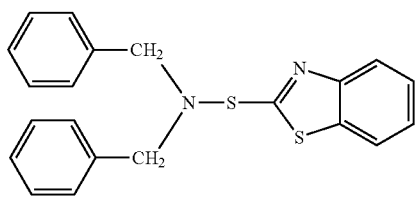

(1)

A mixing amount of N,N-dibenzylbenzothiazole-2-sulfenamide is desirably 0.1 to 5 parts by mass, more desirably 0.5 to 4 parts by mass, and much more desirably 0.8 to 3 parts by mass, with respect to 100 parts by mass of the diene rubber.

As the vulcanization accelerator, N,N-dibenzylbenzothiazole-2-sulfenamide alone is desirably used, and other vulcanization accelerators may be used in combination. It is desirable that N,N-dicyclohexyl-2-benzothiazolesulfenamide is not contained as much as possible. Even though N,N-dicyclohexyl-2-benzothiazolesulfenamide is contained, the mixing amount thereof is desirably 0.5 part by mass or less, and more desirably 0.3 part by mass or less, with respect to 100 parts by mass of the diene rubber.

Either one or both of hexamethylene bis-thiosulfate disodium salt dihydrate and 1,6-bis(N,N-dibenzylthiocarbamoyldithio)hexane are mixed with the rubber composition. Hexamethylene bis-thiosulfate disodium salt dihydrate is a thiosulfate salt represented by the following formula (2). 1,6-bis(N,N-dibenzylthiocarbamoyldithio)hexane is a thiocarbamoyl compound represented by the following formula (3).

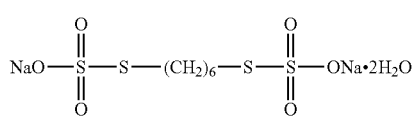

(2)

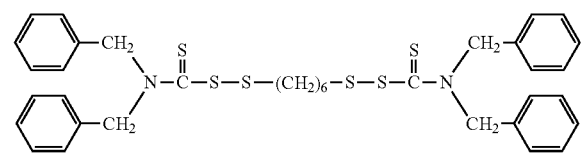

(3)

It is considered that these compounds form a $—S_x—S—(CH_2)_6—S—S_y—$ bond in rubber and in an interface between the rubber and the steel cord. The above-described bond is thermally more stable than a polysulfide bond, thereby having an effect of improving adhesiveness after aging. Therefore, the initial adhesiveness, the adhesiveness after aging, and the adhesiveness after storage can be significantly improved in combination with N,N-dibenzylbenzothiazole-2-sulfenamide as the vulcanization accelerator as described above. Therefore, even though cobalt organic acid, which is a general-purpose adhesion accelerator, is not necessarily contained in the rubber composition, excellent adhesiveness between the rubber composition and the steel cord can be obtained.

A mixing amount of hexamethylene bis-thiosulfate disodium salt dihydrate and/or 1,6-bis(N,N-dibenzylthiocarbamoyldithio)hexane (when only either one of the two is mixed, the mixing amount thereof indicates a mixing amount of only one, and when both are mixed, the mixing amount thereof indicates a total amount of a mixing amount of both) is desirably 0.1 to 5 parts by mass, more desirably 0.3 to 4 parts by mass, and much more desirably 0.5 to 3 parts by mass, with respect to 100 parts by mass of the diene rubber.

The cobalt organic acid is not contained in the rubber composition, or even though the cobalt organic acid is contained therein, a content of the cobalt organic acid is desirably 3 parts by mass or less with respect to 100 parts by mass of the diene rubber. It is desirable that the cobalt organic acid is mixed with the rubber composition from a viewpoint of the adhesiveness, but it is desirable to reduce a usage amount of the cobalt organic acid from a viewpoint of the influence on the environment. In the present embodiment, the adhesiveness can be significantly improved by combining N,N-dibenzylbenzothiazole-2-sulfenamide with hexamethylene bis-thiosulfate disodium salt dihydrate and/or 1,6-bis(N,N-dibenzylthiocarbamoyldithio)hexane. Therefore, even though the usage amount of the cobalt organic acid is reduced, adhesiveness equal to or higher than that of a related-art product can be obtained.

The mixing amount of the cobalt organic acid is more desirably 2 parts by mass or less, and much more desirably 1 part by mass or less, with respect to 100 parts by mass of the diene rubber, and may be 0.5 part by mass or less with respect thereto. In one embodiment, the mixing amount of the cobalt organic acid may be 0.2 to 1 part by mass with respect to 100 parts by mass of the diene rubber. A content of the cobalt organic acid in terms of metallic cobalt is desirably 0.3 part by mass or less, more desirably 0.2 part by mass or less, and much more desirably 0.1 part by mass or less, with respect to 100 parts by mass of the diene rubber, and may be 0.05 part by mass or less with respect thereto. In one embodiment, the content of the cobalt organic acid in terms of metallic cobalt may be 0.02 to 0.1 part by mass with respect to 100 parts by mass of the diene rubber.

As the cobalt organic acid, examples thereof include cobalt naphthenate, cobalt stearate, cobalt oleate, cobalt neodecanoate, cobalt rosinate, cobalt borate, cobalt maleate, or the like. Among the examples thereof, cobalt naphthenate and cobalt stearate are particularly desirable from a viewpoint of processability.

It is desirable that the rubber composition is mixed with a phenolic compound and/or a phenolic resin obtained by condensing the phenolic compound with formaldehyde as a methylene receptor, and hexamethylenetetramine and/or a melamine derivative as a methylene donor. The adhesiveness between the rubber and the steel cord can be further improved by curing the rubber by using the phenolic compound and/or the phenolic resin, and the hexamethylenetetramine and/or the melamine derivative.

As the phenolic compounds, examples thereof include phenol, resorcinol, or an alkyl derivative thereof. The alkyl derivative includes a derivative formed of a relatively long-chain alkyl group such as nonylphenol and octylphenol in addition to a methyl group derivative such as cresol and xylenol. The phenolic compound may contain an acyl group such as an acetyl group or the like as a substituent.

The phenolic resin includes a formaldehyde resin including a plurality of phenolic compounds in addition to a resorcinol-formaldehyde resin, a phenol resin (that is, a phenol-formaldehyde resin), a cresol resin (that is, a cresol-formaldehyde resin), or the like. The above-described resins are uncured resins, and resins which are liquid or have thermal fluidity are used for the above-described resins.

Among the examples thereof, resorcinol and/or a resorcinol resin are desirable as the methylene receptor. As the resorcinol resin, an example thereof includes the one obtained by condensing at least one type selected from a group consisting of resorcinol and its alkyl derivative with aldehyde such as formaldehyde or the like, and other monomer components such as alkylphenol or the like may be used together. Specifically, the resorcinol-formaldehyde resin obtained by condensation of resorcinol and formaldehyde, and a resorcinol-alkylphenol-formaldehyde resin obtained by condensation of resorcinol, alkylphenol, and formaldehyde are desirable.

A mixing amount of the phenolic compound and/or the phenolic resin is not particularly limited. The mixing amount thereof is desirably 0.5 to 5 parts by mass, and more desirably 1 to 3 parts by mass, with respect to 100 parts by mass of the diene rubber.

As the melamine derivative, examples thereof include methylol melamine, a partially etherified product of methylol melamine, a condensate of melamine, formaldehyde, and methanol, or the like. Among the examples thereof, hexamethoxymethylmelamine is particularly desirable.

A mixing amount of the hexamethylenetetramine and/or the melamine derivative is only an amount enough to sufficiently perform reaction and curing with respect to the phenolic compound and/or the phenolic resin. Specifically, the mixing amount thereof is desirably 0.5 to 2 times the parts by mass of the mixing amount of the phenolic compound and/or the phenolic resin.

Carbon black and/or silica can be mixed with the rubber composition as a reinforcing filler. Carbon black is not particularly limited, and examples thereof include SAF class (N100 series), ISAF class (N200 series), HAF class (N300 series), and FEF class (N500 series) (both ASTM grade). Any one type of the examples or a combination of two or more types of the examples can be used. The HAF class is more desirable. An example of silica includes wet silica such as wet sedimentation method silica, wet gel method silica, or the like.

A mixing amount of the reinforcing filler is not particularly limited, and, for example, may be 20 to 120 parts by mass, 30 to 100 parts by mass, or 40 to 80 parts by mass, with respect to 100 parts by mass of the diene rubber. A mixing amount of carbon black is not particularly limited, and may be 20 to 100 parts by mass or 40 to 80 parts by mass, with respect to 100 parts by mass of the diene rubber.

In addition to the above-described components, various additives generally used in the type of rubber composition such as zinc oxide, an anti-aging agent, a softener, stearic acid, a wax, a processing aid, or the like can be freely and selectively mixed with the rubber composition.

The rubber composition can be manufactured by kneading according to a related-art method by using a normally used mixing machine such as a Banbury mixer, a kneader, a roll, or the like. That is, in a first mixing step, hexamethylene bis-thiosulfate disodium salt dihydrate, 1,6-bis(N,N-dibenzylthiocarbamoyldithio)hexane, and other additives except sulfur and a vulcanization accelerator are added to diene rubber and mixed therewith. Next, the sulfur and the vulcanization accelerator are added to the obtained mixture and mixed therewith in a final mixing step. Accordingly, it is possible to manufacture the rubber composition.

The rubber composition can be used as a rubber composition for coating various steel cords, and a rubber-steel cord composite can be obtained. The rubber-steel cord composite can be manufactured by vulcanizing the rubber composition in a state of contacting the steel cord. A heating temperature at the time of vulcanization is not particularly limited, and may be, for example, 140 to 180° C. As the steel cord, a steel cord whose surface is plated with brass plating, bronze plating, zinc plating, or the like is desirably used, and more desirably, a brass-plated steel cord is used.

The rubber-steel cord composite according to the present embodiment can be used as a reinforcing material for a tire such as a belt, a carcass ply, a chafer, or the like, of a pneumatic tire, or as a reinforcing material for reinforcing an industrial belt member or the like. The rubber-steel cord composite is desirably used as a reinforcing material for a pneumatic tire. Therefore, the pneumatic tire according to the present embodiment includes the rubber-steel cord composite.

When the rubber-steel cord composite is used as the reinforcing material for the belt, the carcass ply, the chafer, or the like, of the pneumatic tire, a steel cord topping cloth is manufactured by topping the steel cord with the rubber composition by a topping device such as a steel calendar or the like according to a related-art method. An unvulcanized tire is manufactured by using the steel cord topping cloth as the belt, the carcass ply, the chafer, or the like. The pneumatic tire can be manufactured by vulcanizing and molding the unvulcanized tire at, for example, 140 to 180° C.

The pneumatic tire may be a passenger car tire or a heavy-duty tire such as a truck, a bus, or the like, and is not particularly limited. A structure of the pneumatic tire is well known and is not particularly limited. In general, the pneumatic tire includes: a pair of left and right bead portions and sidewalls; a tread provided between both sidewalls so as to connect radial outward ends of the left and right sidewalls; and at least one carcass ply extending across the pair of left and right bead portions. In the carcass ply, both ends of the carcass ply are locked by the bead portions from the tread to the sidewall to reinforce the respective portions. The belt is usually provided in two or more layers between the carcass ply and the tread rubber on an outer peripheral side of the carcass ply in the tread, and reinforces the tread on the outer peripheral side of the carcass ply. The chafer is embedded in the bead portion to reinforce the bead portion. When the rubber-steel cord composite is used for a reinforcement material for a tire, the rubber-steel cord composite may be applied to either one of the belt, the carcass, and the chafer, or may be applied to two or more.

EXAMPLES

Hereinafter, the present disclosure will be described in more detail with reference to Examples, and the present disclosure is not limited to the Examples.

The Banbury mixer is used, and the rubber composition for coating the steel cord is manufactured according to a related-art method according to composition (parts by mass) shown in Table 1 below. Specifically, in a first mixing step, another compounding agent except the sulfur and the vulcanization accelerator is added to diene rubber and kneaded therewith (discharge temperature=150° C.). Next, the sulfur and the vulcanization accelerator are added to the obtained kneaded material and kneaded therewith in a final mixing step (discharge temperature=110° C.), thereby manufacturing the rubber composition. Respective components in Table 1 are described as follows.

Natural rubber: RSS #3

Isoprene rubber: "IR2200" manufactured by JSR Co., Ltd.

Carbon black: "Seast 300 (HAF-LS)" manufactured by Tokai Carbon Co., Ltd.

Zinc oxide: "Zinc oxide No. 3" manufactured by Mitsui Mining & Smelting Co., Ltd.

Anti-aging agent: "Santoflex 6PPD" manufactured by Flexis Co., Ltd.

Cobalt stearate: "Cobalt stearate" manufactured by ENEOS Corporation. (Co content 9.5% by mass)

Melamine derivative: Hexamethoxymethylmelamine, "Ciretz 963L" manufactured by Mitsui Cytec Co., Ltd.

Resorcinol resin: resorcinol-alkylphenol-formaldehyde resin, "Sumikanol 620" manufactured by Sumitomo Chemical Co., Ltd.

HTS: Hexamethylene bis-thiosulfate disodium salt dihydrate, "Duralink HTS" manufactured by Eastman Chemical Company KA9188: 1,6-bis(N,N-dibenzylthiocarbamoyldithio)hexane, "Vulcrene KA9188" manufactured by LANXESS Insoluble sulfur: "Crystex HS OT-20" manufactured by Flexis (80% by mass is sulfur content)

DCBS: N,N-dicyclohexyl-2-benzothiazolesulfenamide, "Noxeller DZ-G" manufactured by Ouchi Shinko Chemical Industrial Co., Ltd.

DBBS: N,N-dibenzylbenzothiazole-2-sulfenamide

With respect to each of the obtained rubber compositions, an unvulcanized composite is manufactured by the following method, and then the initial adhesiveness, the adhesiveness after storage, and the adhesiveness after aging are evaluated by the following evaluation method.

Manufacturing of Unvulcanized Composite

A rubber sheet having a thickness of 1.0 mm is manufactured by sheeting the rubber composition. Brass-plated steel cords (structure: 3×0.20 mm+6×0.35 mm) are arranged at a space of 12 pieces/25 mm, and sandwiched between the rubber sheets. Next, the two brass-plated steel cords sandwiched therebetween are stacked, thereby manufacturing an unvulcanized composite having two layers of the steel cord.

Initial Adhesiveness

The unvulcanized composite is vulcanized at 150° C. for 30 minutes, thereby obtaining a test piece for evaluation having a width of 25 mm. A peeling test between two layers of the steel cords is performed on the obtained test piece by using AUTOGRAPH ("DCS500" manufactured by Shimadzu Corporation). A rubber coverage ratio of the steel cord after peeling is visually confirmed, and the initial adhesiveness is displayed with an index when the rubber coverage ratio of Comparative Example 1 is set to 100. It is indicated that as the index is higher, the initial adhesiveness is excellent.

Adhesiveness After Storage

The unvulcanized composite is left in a constant temperature and constant humidity chamber at 40° C.×95% RH for 5 days, and then vulcanized at 150° C. for 30 minutes, thereby obtaining the test piece for evaluation having the width of 25 mm. The peeling test between two layers of the steel cords is performed on the obtained test piece by using AUTOGRAPH ("DCS500" manufactured by Shimadzu Corporation). The rubber coverage ratio of the steel cord after peeling is visually confirmed, and the adhesiveness after storage is displayed with an index when the rubber coverage ratio of Comparative Example 1 is set to 100. It is indicated that as the index is higher, the adhesiveness after storage is excellent.

Adhesiveness After Aging

The unvulcanized composite is vulcanized at 150° C. for 30 minutes, thereby obtaining the test piece for evaluation having the width of 25 mm. After the obtained test piece is left in saturated steam at 105° C. for 96 hours, the peeling test between two layers of the steel cords is performed on the obtained test piece by using AUTOGRAPH ("DCS500" manufactured by Shimadzu Corporation). The rubber coverage ratio of the steel cord after peeling is visually confirmed, and the adhesiveness after aging is displayed with an index when the rubber coverage ratio of Comparative Example 1 is set to 100. It is indicated that as the index is higher, the adhesiveness after wet heat aging is excellent.

TABLE 1

| | Com. 1 | Com. 2 | Com. 3 | Com. 4 | Em. 1 | Em. 2 | Em. 3 | Em. 4 | Em. 5 | Em. 6 | Em. 7 | Em. 8 | Em. 9 | Em. 10 | Em. 11 | Em. 12 |
|---|---|---|---|---|---|---|---|---|---|---|---|---|---|---|---|---|
| Composition (parts by mass) | | | | | | | | | | | | | | | | |
| Natural rubber | 100 | 100 | 100 | 100 | 100 | 100 | 100 | 100 | 100 | 100 | 100 | 100 | 100 | 100 | 90 | 90 |
| Isoprene rubber | — | — | — | — | — | — | — | — | — | — | — | — | — | — | 10 | 10 |
| Carbon black | 60 | 60 | 60 | 60 | 60 | 60 | 60 | 60 | 60 | 60 | 60 | 60 | 60 | 60 | 60 | 60 |
| Zinc oxide | 8 | 8 | 8 | 8 | 8 | 8 | 8 | 8 | 8 | 8 | 8 | 8 | 8 | 8 | 8 | 8 |
| Anti-aging agent | 2 | 2 | 2 | 2 | 2 | 2 | 2 | 2 | 2 | 2 | 2 | 2 | 2 | 2 | 2 | 2 |
| Cobalt stearate | 2 | 2 | — | 2 | 2 | 1 | 2 | 2 | 2 | 2 | 0.5 | — | 2 | — | — | — |
| Melamine derivative | 2 | 2 | 2 | 2 | 2 | 2 | 2 | 2 | 2 | 2 | 2 | 2 | 2 | 2 | 2 | 2 |
| Resorcinol resin | 2 | 2 | 2 | 2 | 2 | 2 | 2 | 2 | 2 | 2 | 2 | 2 | 2 | 2 | 2 | 2 |
| HTS | — | 2 | 2 | — | 2 | 2 | 2 | 2 | 0.5 | 4 | 2 | 2 | — | — | 2 | 1 |
| KA9188 | — | — | — | — | — | — | — | — | — | — | — | — | 2 | 2 | — | 1 |
| Insoluble sulfur | 6 | 6 | 6 | 6 | 6 | 6 | 6 | 6 | 6 | 6 | 6 | 6 | 6 | 6 | 6 | 6 |
| DCBS | 1 | 1 | 1 | — | — | — | — | — | — | — | — | — | — | — | — | — |
| DBBS | — | — | — | 1 | 1 | 1 | 2 | 4 | 1 | 1 | 1 | 1 | 1 | 1 | 1 | 1 |

TABLE 1-continued

| | Com. 1 | Com. 2 | Com. 3 | Com. 4 | Em. 1 | Em. 2 | Em. 3 | Em. 4 | Em. 5 | Em. 6 | Em. 7 | Em. 8 | Em. 9 | Em. 10 | Em. 11 | Em. 12 |
|---|---|---|---|---|---|---|---|---|---|---|---|---|---|---|---|---|
| Evaluation (index) | | | | | | | | | | | | | | | | |
| Initial adhesiveness | 100 | 105 | 95 | 110 | 110 | 109 | 120 | 115 | 110 | 120 | 108 | 105 | 110 | 105 | 105 | 110 |
| Adhesiveness after storage | 100 | 105 | 95 | 110 | 135 | 125 | 140 | 140 | 125 | 135 | 125 | 120 | 120 | 110 | 115 | 110 |
| Adhesiveness after aging | 100 | 115 | 100 | 135 | 140 | 135 | 150 | 140 | 115 | 145 | 135 | 125 | 125 | 105 | 130 | 120 |

The results are shown in Table 1. In comparison with Comparative Example 1 in which DCBS is used as the vulcanization accelerator, the adhesiveness is improved but an improvement range thereof is small in Comparative Example 2 in which HTS is added. Therefore, in Comparative Example 3 in which cobalt stearate is removed from Comparative Example 2, the initial adhesiveness and the adhesiveness after storage deteriorate in comparison with Comparative Example 1 as a control, such that an effect of improving the adhesiveness after aging is not obtained.

On the other hand, in Examples 1 and 3 to 6 in which HTS as well as the vulcanization accelerator DBBS are mixed, a significant improvement effect is obtained in all of the initial adhesiveness, the adhesiveness after storage, and the adhesiveness after aging. Therefore, as shown in Examples 2, 7 and 8, even when a usage amount of cobalt stearate which is an adhesion accelerator is reduced, and cobalt stearate is not mixed, the effect of improving the adhesiveness is obtained in comparison with Comparative Example 1 which is the control.

In Example 9 as well in which KA9188 as well as the vulcanization accelerator DBBS are mixed, a significant improvement effect is obtained in the initial adhesiveness, the adhesiveness after storage, and the adhesiveness after aging in comparison with Comparative Example 1 which is the control. As shown in Example 10, even though cobalt stearate is not mixed, the effect of improving the adhesiveness is obtained in comparison with Comparative Example 1. Based upon comparison between Example 1 and Example 9 and comparison between Example 8 and Example 10, as a compound to be combined with the vulcanization accelerator DBBS, HTS has a higher effect of improving adhesiveness than that of KA9188.

As shown in Example 11, even when the composition of diene rubber is changed with respect to Example 8, the effect of improving the adhesiveness is obtained. As shown in Example 12, the effect of improving the adhesiveness is also obtained when HTS and KA9188 are used together.

What is claimed is:

1. A rubber-steel cord composite formed by vulcanizing and bonding a rubber composition containing 1 to 10 parts by mass of sulfur, 0.1 to 5 parts by mass of N,N-dibenzylbenzothiazole-2-sulfenamide, and 0.5 to 4 parts by mass of either of hexamethylene bis-thiosulfate disodium salt dihydrate or 1,6-bis(N,N-dibenzylthiocarbamoyldithio)hexane, with respect to 100 parts by mass of diene rubber containing natural rubber, and a steel cord.

2. The rubber-steel cord composite according to claim 1, wherein the rubber composition does not contain cobalt organic acid, or a content of the cobalt organic acid is 3 parts by mass or less with respect to the 100 parts by mass of diene rubber.

3. The rubber-steel cord composite according to claim 2, wherein the rubber composition contains the hexamethylene bis-thiosulfate disodium salt dihydrate.

4. The rubber-steel cord composite according to claim 2, wherein the rubber composition contains the 1,6-bis(N,N-dibenzylthiocarbamoyldithio)hexane.

5. The rubber-steel cord composite according to claim 2, wherein the 100 parts by mass of diene rubber contains 50 parts by mass or more of natural rubber.

6. The rubber-steel cord composite according to claim 2, wherein the rubber composition further contains a phenolic compound and/or a phenolic resin as a methylene receptor, and hexamethylenetetramine and/or a melamine derivative as a methylene donor,
an amount of the phenolic compound and/or the phenolic resin is 0.5 to 5 parts by mass with respect to the 100 parts by mass of diene rubber, and
an amount of the hexamethylenetetramine and/or the melamine derivative is 0.5 to 2 times the parts by mass of the amount of the phenolic compound and/or the phenolic resin.

7. The rubber-steel cord composite according to claim 1, wherein the rubber composition contains the hexamethylene bis-thiosulfate disodium salt dihydrate.

8. The rubber-steel cord composite according to claim 1, wherein the rubber composition contains the 1,6-bis(N,N-dibenzylthiocarbamoyldithio)hexane.

9. The rubber-steel cord composite according to claim 1, wherein the 100 parts by mass of diene rubber contains 50 parts by mass or more of natural rubber.

10. The rubber-steel cord composite according to claim 1, wherein the rubber composition further contains a phenolic compound and/or a phenolic resin as a methylene receptor, and hexamethylenetetramine and/or a melamine derivative as a methylene donor,
an amount of the phenolic compound and/or the phenolic resin is 0.5 to 5 parts by mass with respect to the 100 parts by mass of diene rubber, and
an amount of the hexamethylenetetramine and/or the melamine derivative is 0.5 to 2 times the parts by mass of the amount of the phenolic compound and/or the phenolic resin.

11. A pneumatic tire comprising the rubber-steel cord composite according to claim 1.

* * * * *